UNITED STATES PATENT OFFICE.

ARTHUR CAMNITZER, OF NEW YORK, N. Y.

METHOD OF MAKING CAUSTIC COLLODION.

SPECIFICATION forming part of Letters Patent No. 627,296, dated June 20, 1899.

Application filed October 18, 1898. Serial No. 693,871. (No specimens.)

*To all whom it may concern:*

Be it known that I, ARTHUR CAMNITZER, a subject of the King of Prussia, German Emperor, residing at New York, in the county of New York and State of New York, have invented certain new and useful Improvements in Processes of Making Liquid Caustics; and I do hereby declare the following to be a full, clear, and exact description of the invention, such as will enable others skilled in the art to which it appertains to make and use the same.

This invention relates to a new chemical compound intended more particularly for medicinal purposes; and it consists particularly in compounding liquid caustics wherein the chemical chlorid of zinc forms a considerable portion and is compounded in alcoholic solution with collodion, the composition being intended for external application as a topical remedy for removing blemishes and for treatment of nævus, and the strong caustic and antiseptic properties of the chlorid of zinc are thereby retarded and diminished.

Chlorid of zinc, as is well known, is a substance possessed of very caustic and antiseptic properties. It could not be applied to the epidermis as such, and even in my composition it is to be applied by physicians only. To obviate and overcome the objection to the substance chlorid of zinc and to render the same susceptible of being applied externally as a topical remedy, I form a liquid composition composed, essentially, of an alcoholic solution of chlorid of zinc and collodion. In order to facilitate the solution of chlorid of zinc, some hydrochloric acid is added for the purpose of transforming traces of basic chlorid of zinc generally occurring in this substance into chlorid of zinc, and then I add the alcohol. This solution is now mixed with collodion and then some ethylic ether, and finally a few drops of an alcoholic solution of methylene-blue are added. The collodion employed is specially prepared. It contains one part, by weight, of colloxyline in one cubic centimeter of alcohol and twenty-three cubic centimeters of ethylic ether. The commercial collodion does not produce such a desirable liquid.

The proportions in which the components of the composition are employed are as follows: Fifty parts, by weight, of chlorid of zinc are dissolved in three to five cubic centimeters of hydrochloric acid and twelve cubic centimeters of alcohol of about ninety-six per cent. Then twenty-five parts, by weight, of specially-prepared collodion are mixed with the solution, and finally fifteen cubic centimeters of ethylic ether and a few drops of a solution of methylene-blue are added to the whole composition. The compound thus formed is a thick gelatinous liquid of bluish color. If applied, the caustic properties of the composition eat up the nævus, while at the same time its antiseptic properties have a healing effect, so that white skin is formed, while the methylene-blue has a pacifying effect on the nerve ends.

The proportions above described may vary within reasonable limits without materially altering the character of this composition.

Having thus described my invention, what I claim therein as new, and desire to secure by Letters Patent, is—

1. The process of compounding a liquid chemical composition comprising essentially chlorid of zinc and collodion and consisting in dissolving fifty parts by weight of chlorid of zinc in three to five cubic centimeters of hydrochloric acid and twelve cubic centimeters of alcohol, then mixing with it twenty-five parts of collodion, and then adding fifteen cubic centimeters of ethylic ether, and a few drops of methylene-blue solution, as specified.

2. The process of compounding a liquid chemical composition comprising essentially chlorid of zinc and collodion and consisting in dissolving fifty parts by weight of chlorid of zinc in three to five cubic centimeters of hydrochloric acid and twelve cubic centimeters of alcohol, then mixing with it twenty-five parts of collodion specially prepared and containing one part by weight of colloxyline in one cubic centimeter of alcohol and twenty-three cubic centimeters of ethylic ether, and finally adding to the whole fifteen cubic centimeters of ethylic ether, and a few drops of methylene-blue solution, as specified.

In testimony whereof I have hereunto affixed my signature in presence of two witnesses.

ARTHUR CAMNITZER.

Witnesses:
EDWARD WOODWARD,
M. DUNCAN.